A. O. KIRKWOOD.
COMBINED DESK, WASH-STAND AND BLACKING CASE.
No. 189,942. Patented April 24, 1877.
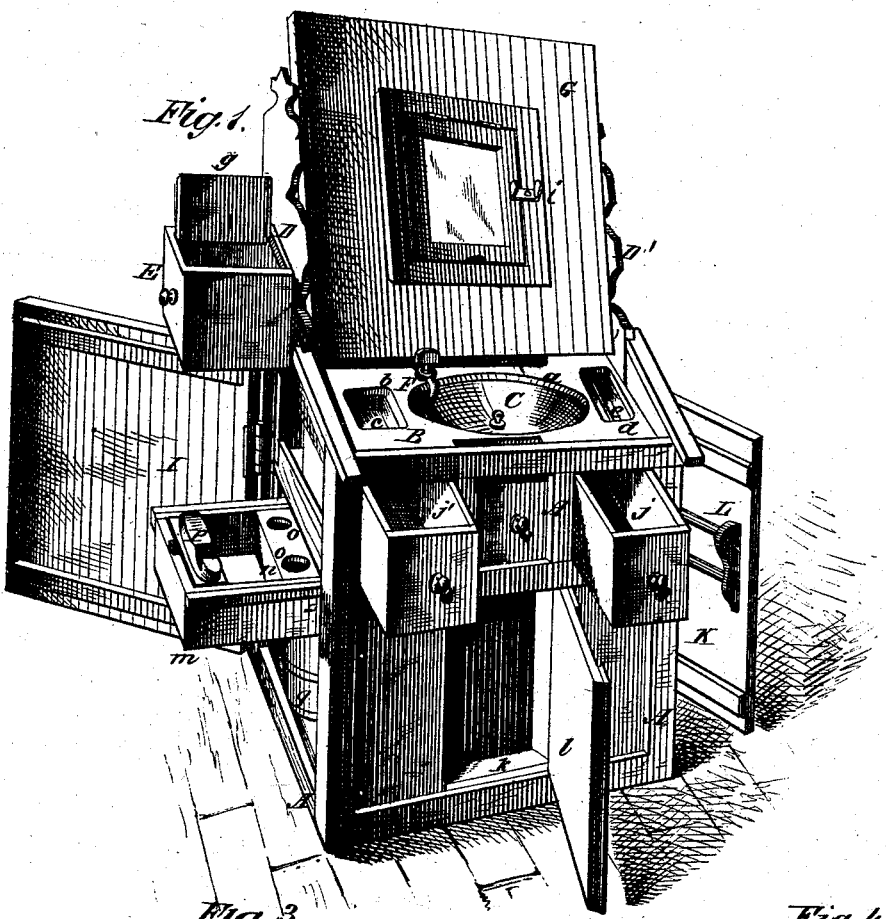
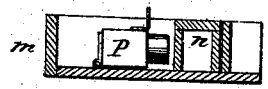
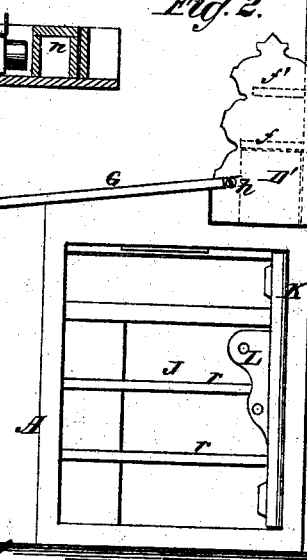
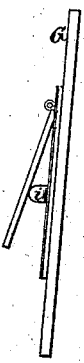
WITNESSES:
Francis McArdle
J. H. Scarborough
INVENTOR:
A. O. Kirkwood
BY
ATTORNEYS.
N. PETERS, PHOTO-LITHOGRAPHER, WASHINGTON, D. C.

UNITED STATES PATENT OFFICE.

ALEXANDER O. KIRKWOOD, OF YONKERS, NEW YORK.

IMPROVEMENT IN COMBINED DESK, WASH-STAND, AND BLACKING-CASE.

Specification forming part of Letters Patent No. 189,942, dated April 24, 1877; application filed December 30, 1876.

*To all whom it may concern:*

Be it known that I, ALEXANDER O. KIRKWOOD, of Yonkers, in the county of Westchester and State of New York, have invented a new and Improved Combined Desk, Wash-Stand, and Blacking-Case, of which the following is a specification:

Figure 1 is a perspective view. Fig. 2 is an end elevation. Fig. 3 is a sectional view of the blacking case or drawer. Fig. 4 is a detail vertical section, showing the mirror held in an inclined plane by one of the ears of the button.

Similar letters of reference indicate corresponding parts.

My invention consists in the combination, in a single piece of furniture, of a desk having a convenient receptacle for books and papers, a wash-stand having a convenient reservoir for water, a stationary bowl, an adjustable mirror, and a closet for towels, &c., and also a towel-rack and a blacking-case, which contains a folding rest for the foot and a place for the blacking and brush.

Referring to the drawing, A is the main body of the wash-stand, having a horizontal top, B, in the center of which a circular aperture, *a*, is made.

A wash-bowl, C, having the usual central drip-pipe and an overflow-pipe, is suspended under the aperture *a*.

An aperture, *b*, is made at one side of the bowl for the soap-dish *c*, and *d* is an aperture made on the opposite side of the bowl for the brush-receptacle *e*.

D D' are end pieces that support the shelves *f f'*, and rest on the part A, where they are held in place by dowels. The end piece D is cut out below the shelf *f*, to admit of sliding the water-reservoir under the said shelf.

The water-reservoir E is provided with a metallic lining and a water-tight cover, a part of which, *g*, is hinged, to admit of filling the reservoir.

F is a stop-cock that projects from the reservoir over the bowl C. Its curved end projects downward into the aperture *a*, and serves to limit the motion of the reservoir when drawn out, as shown in the drawing, for the purpose of filling.

G is a desk-top, which is pivoted at *h* in the end pieces D D', in such a way that when it is turned down, covering the washbowl, it rests on the front of the part A, and is inclined at a convenient angle for writing purposes.

A mirror, H, is hinged to the under side of the cover G, and is retained in place by the button *i*, which is provided with projecting ears, that serve to hold the mirror in an inclined position when it is raised on its hinges and the button is turned under it.

The ends of the part A are extended upward above the top B, and their upper edges are inclined to correspond with the inclination of the top G, which shuts down between them. Drawers *j j'* are fitted to the upper portion of the part A, and a recess, *k*, is formed in the center of the part A near the bottom, for receiving the feet when the desk is used. A door, *l*, closes the recess *k* when it is not in use.

In the left-hand side of the part A a drawer, *m*, is fitted, which slides under the drawer *j'*, and is provided with a block, *n*, in which sockets *o o* are made for receiving blacking-boxes, and with a hinged foot-rest, P, which is capable of being raised up into a vertical position, as shown in Fig. 1, or of being folded down into a horizontal position, as shown in Fig. 3, when the space between it and the outer end of the drawer serves as a receptacle for blacking-brushes.

Below the drawer *m* a space, *q*, is left for the slop-pail, into which the waste of the bowl C drips, and for other articles. A door, I, closes over the drawer *m* and space *q*, and forms a panel for the side of the stand.

A vertical partition divides the part A near the center, and forms a closet, J, having shelves *r*. K is a door for closing the closet, to the inner surface of which a towel-rack, L, is attached.

When the stand is used in dwellings provided with water-pipes, a connection may be made between the stop cock F and the pipes, and the drip-pipe of the bowl may be connected with the waste-pipes.

All of the various parts of my improvement are arranged so as to form a compact, convenient, and useful piece of household furniture.

Having thus described my invention, I claim as new and desire to secure by Letters Patent—

1. The end pieces D D', supporting shelves $ff'$, and one of said end pieces being cut out to admit the sliding reservoir E, as shown and described.

2. In a combined desk, wash-stand, and blacking-case, the drawer $m$, having the block $n$ and the hinged foot-rest P, constructed and arranged substantially as shown and described.

3. The button $i$, provided with projecting ears, in combination with the hinged mirror H, substantially as and for the purpose shown and described.

ALEXANDER O. KIRKWOOD.

Witnesses:
 JOHN W. ALEXANDER,
 W. F. WASHBURN.